United States Patent [19]

Schuler

[11] 4,171,963
[45] Oct. 23, 1979

[54] FILTER ELEMENT SUPPORT MEMBER

[75] Inventor: Frederick E. Schuler, St. Paul, Minn.

[73] Assignee: Donaldson Company, Inc., Minneapolis, Minn.

[21] Appl. No.: 874,347

[22] Filed: Feb. 1, 1978

[51] Int. Cl.² ............... B01D 29/16; B01D 46/24
[52] U.S. Cl. ................... 55/302; 55/484; 55/492; 55/498; 55/284
[58] Field of Search ............ 210/323 T, 488, 493 R, 210/493 B; 55/302, 483, 484, 492, 498, 499, 501, 379, 284, 273

[56] References Cited

U.S. PATENT DOCUMENTS

| | | | |
|---|---|---|---|
| 2,278,798 | 4/1942 | Riccardi | 55/302 X |
| 2,511,598 | 6/1950 | Reeves | 55/302 X |
| 2,951,551 | 9/1960 | West | 55/484 X |
| 3,385,038 | 5/1968 | Davis | 55/484 |
| 3,431,709 | 3/1969 | Kawanami | 210/323 T X |
| 3,594,992 | 7/1971 | Carr et al. | 55/302 |
| 3,630,005 | 12/1971 | Reinauer | 55/302 |
| 3,847,577 | 11/1974 | Hansen | 55/498 X |
| 3,857,688 | 12/1974 | Wisnewski | 55/498 X |
| 3,906,724 | 9/1975 | Yoshizaki | 55/483 X |
| 4,073,632 | 2/1978 | Reinauer et al. | 55/498 X |

OTHER PUBLICATIONS

Dust Collectors, Bulletin TD2300, Donaldson Co., May 1975.
Dust Collectors, Bulletin TD6120, Donaldson Co., May 1975.

Primary Examiner—Frank W. Lutter
Assistant Examiner—Gregory N. Clements
Attorney, Agent, or Firm—Merchant, Gould, Smith, Edell, Welter & Schmidt

[57] ABSTRACT

A filter element support assembly for use with hollow, cylindrical, pleated media filter elements is disclosed. The filter elements are placed on the support in end-to-end abutting relationship. The support includes a plurality of baffle plates in parallel spaced relationship, which isolate the interior chamber of each filter element from those of the support assembly into the interior chambers of the filter elements. The tubes are not only the primary structural members of the assembly, but also serve the dual function of providing a means of fluid communication between each isolated filter element chamber and a clean air plenum and source of compressed air, and of guiding and positioning the filter elements in their proper locations.

16 Claims, 9 Drawing Figures

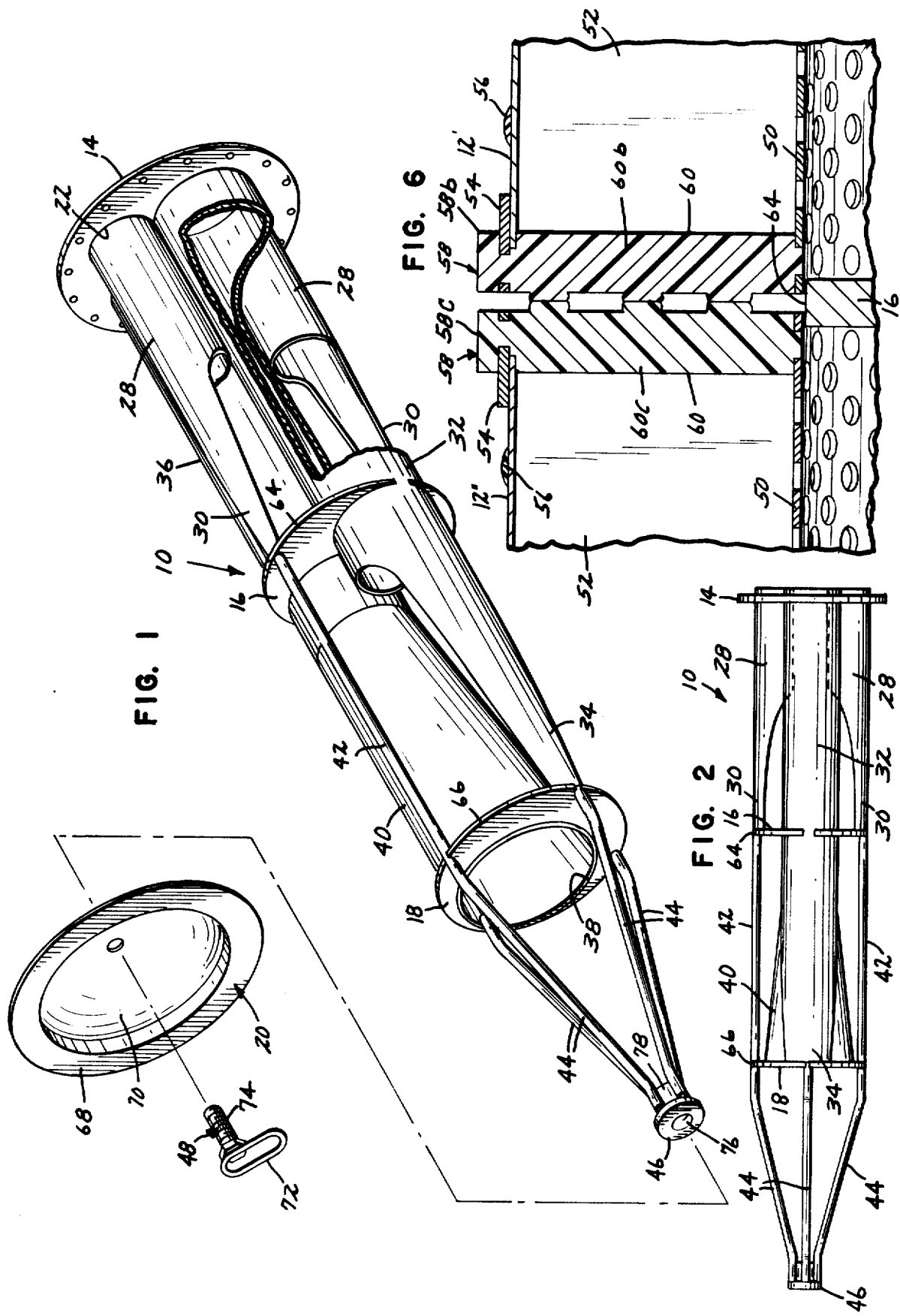

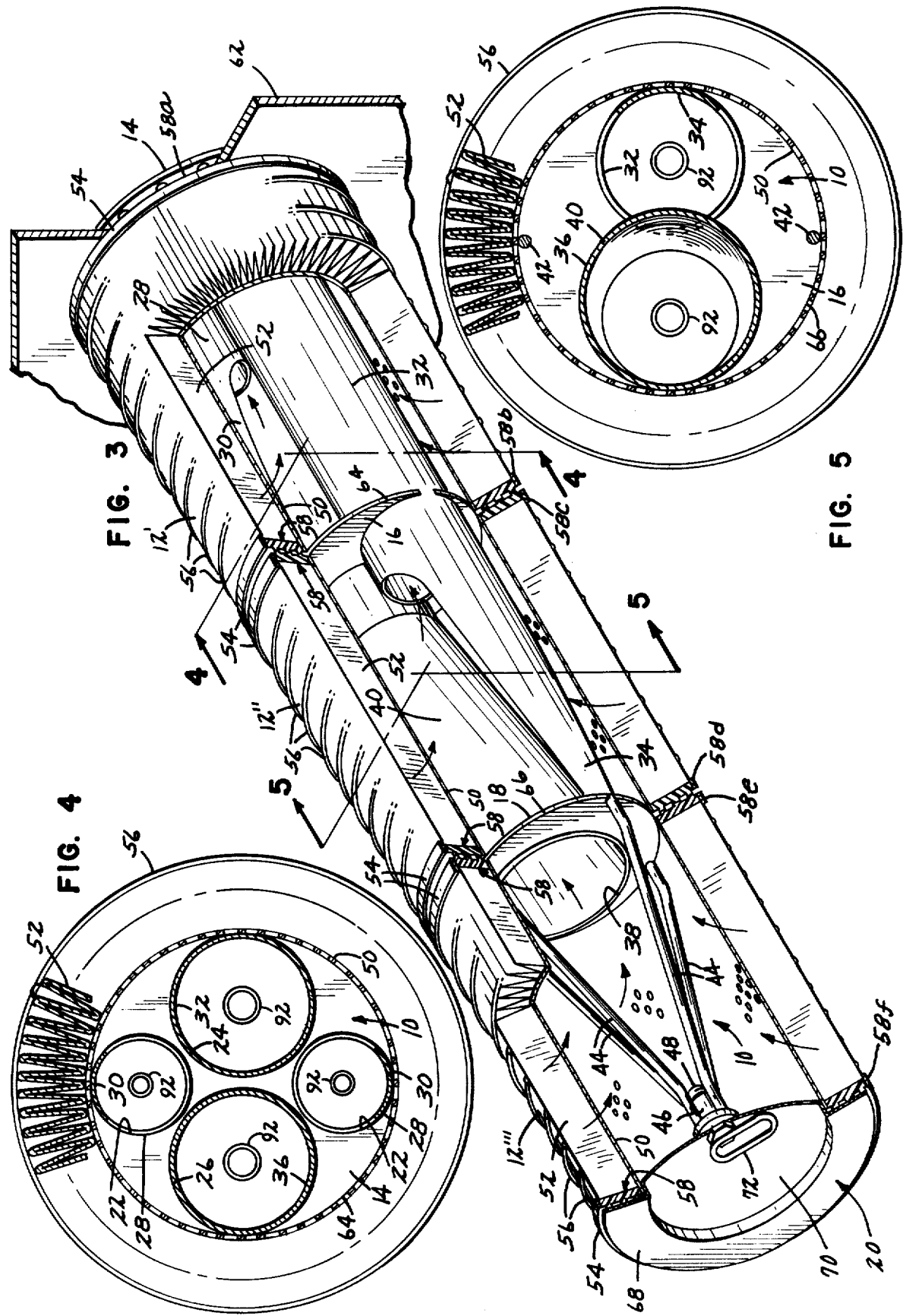

FILTER ELEMENT SUPPORT MEMBER

BACKGROUND OF THE INVENTION

1. Field of the Invention

This invention relates generally to air cleaning systems of the pulse-jet cleaned filter type, which include provision for cleaning of the filter media by periodically generating a reverse pulse of air through the filter media. More specifically, the invention relates to a support member for a plurality of pleated media filter cartridges, which includes a "venturi" outlet for each cartridge, at which the reverse pulse of compressed air is directed, which is located within the dirty air chamber of the filter system and does not extend into the clean air plenum of the system.

2. Description of the Prior Art

Many prior art industrial filter houses use the pulse-jet cleaning principle, which comprises the step of directing a volume of compressed air, released rapidly through a diaphragm valve and nozzle, at the venturi mounted in the filter element outlet. The sudden pulse of air pressurizes the filter element in the reverse air flow direction, and blows off dust accumulated in the element. Dust so loosened drops into a hopper from which it may be extracted.

Pulse-jet type filter houses normally comprise two working chambers. The first of these is the dirty air chamber, in which the filtering media is located. The most commonly used filter elements for this application are either mesh bag-type elements, or, pleated media cartridges, similar to the familiar pleated paper automotive air filter. The second working chamber is the clean air plenum, which is in fluid communication with a flow inducing means on its down stream end, and the "clean side" of the filter elements on its upstream end. The flow inducing means create a vacuum situation within the clean air plenum, which negative pressure is distributed evenly to each filter element outlet by the plenum. This plenum also typically contains all the plumbing required for pulse jet cleaning of each element.

This plumbing includes a venturi mounted in the outlet of each element, a nozzle directed at each venturi, and some sort of manifold in fluid communication with each nozzle at a source of compressed air. This typical arrangement for bag houses is illustrated by patents to Carr, U.S. Pat. No. 3,594,922, and to Reinaur, U.S. Pat. No. 3,630,005. The typical arrangement where pleated media filter cartridges are used is shown in Torit Donaldson TD2300 and TD6120 filter houses.

A third, passive, chamber included in most filter houses is the hopper, the size of which is determined by the repose angle of the dusts, and the plan area of the filter house.

It is often of concern that a filter house for a particular application occupy as little plant space as possible, while still providing sufficient air cleaning capacity. It has been found that, generally speaking, pleated media cartridges can offer the same amount of filter media area as bag filters, while occupying much less volume. Consequently, the working volume of the dirty air chamber in filter house utilizing cartridges, and, consequently, the overall working volume of such filter houses, can be cut down, while still maintaining flow capacity. This is reflected in the fact that bag houses have an average air flow of about thirty cubic feet per minute per unit of working volume, whereas cartridge-type houses achieve an average air flow of sixty CFM per unit of working volume. "Working volume" is defined as the sum of the volumes of the dirty air chamber and the clean air plenum.

Until the present invention, nothing has been done to further decrease working volumes by decreasing the size of the clean air plenum. This size has been dictated by the considerations of evenly distributing air flow from the flow inducing source to the filter element outlets, and of providing sufficient space to house the reverse pulse plumbing, and also of providing enough room for service access. One of the major space considerations was the length of the venturies mounted in the element outlet.

In general, the prior art has not shown, or taught, how to achieve a ratio of dirty air chamber volume to clean air plenum volume of better than 1:1. This means that, in determining the amount of plant space, or mine space which a filter house will occupy (disregarding hopper space), one would determine the amount of filter media required for the job, i.e., the number of cartridges it would take to clean the required airflow, determine the volume that these cartridges would occupy, and double that volume.

In such applications as coal mining, where a high airflow is required, even the best of the current cartridge-type filter houses occupy too much working space in the mine.

SUMMARY OF THE INVENTION

The present invention relates to a multiple filter element support member which is adapted so as to decrease the working volume of filter houses in which it is utilized, while maintaining high airflow capabilities.

The decrease in working volume is achieved primarily by including the outlet venturies which service each filter cartridge as part of the support member, and a design which "packs" each venturi inside the filter elements, thus placing these venturies inside the dirty air chamber of a filter house, rather than extending into the clean air plenum thereof, whereby the volume of the plenum can be substantially reduced without impairing its flow distributing function. In addition, by packing the venturi tubes within the filter elements, no additional space is required within the dirty air chamber to accommodate their presence.

The support member is designed to carry a plurality of cylindrical filters in end-to-end abutting relationship, and includes a plurality of longitudinally extending pulse tubes, or venturis, and a plurality of baffle plates disposed so as to isolate each filter element from each other filter element. Pulse tubes serve as structural members, as well as to carry a reverse blast of air to the interior of each isolated filter, and are positioned so as to be located entirely within the filters, thus conserving a large amount of space in the clean air plenum portion of the filter house utilizing the support member.

Thus, a filter house can be constructed in which a plurality of multiple filter element support members are employed, and wherein the working volume of the filter house is kept to a minimum. The isolation of the multiple filter elements from each other in the arrangement of the pulse tubes so as to service each isolated filter separately allows for pulse cleaning of an individual filter element while many others continue to operate in their normal mode. Thus, a highly efficient filter house, having a high airflow/unit of working volume ratio can be achieved. In a test unit comprising 15 filter elements mounted on 5 support members, for example, an airflow of 120 CFM per cubic foot of working volume has been achieved.

Other features of the present invention include the design of the pulse tube apertures within each filter so as to provide a shield portion, which serves to protect the relatively fragile pleated media of the filter from being damaged when a reverse pulse shock wave is generated through the tube and into the filter element; and means for easily removing filter elements from the support member for servicing and/or replacement.

BRIEF DESCRIPTION OF THE DRAWINGS

FIG. 1 is an enlarged, exploded, perspective view of the support member of the present invention, with portions thereof broken away.

FIG. 2 is a view in side elevation of the support member shown in FIG. 1.

FIG. 3 is an enlarged view in perspective of the support member of the present invention assembled, with filter elements mounted thereon.

FIG. 4 is a sectional view of the assembled unit, taken along the line 4—4 of FIG. 3.

FIG. 5 is a sectional view of the assembled unit, taken along the line 5—5 of FIG. 3.

FIG. 6 is an enlarged detailed view of a portion of FIG. 5.

DESCRIPTION OF THE PREFERRED EMBODIMENT

Figure 7:
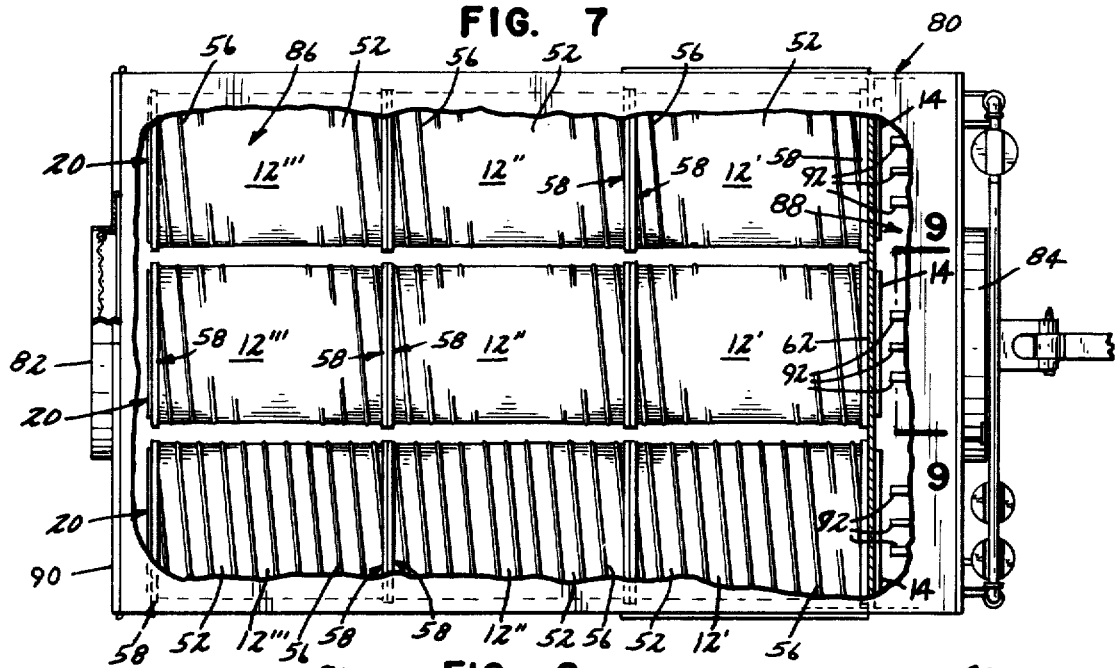
FIG. 7 is a top plan view of a portable filter house employing the present invention, with portions thereof broken away.

Referring now to the drawings, there is shown in FIG. 1 a multiple filter element support member, generally designated by the reference number 10.

Support member 10 is adapted to carry three pleated media filter elements 12', 12", 12''', in coaxially aligned, end-to-end abutting relationship, as shown in FIG. 3.

Figure 9:
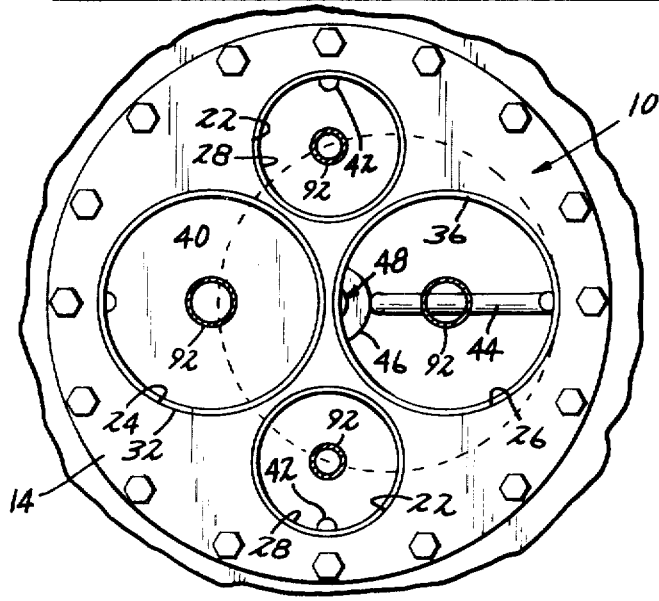
FIG. 9 is an enlarged sectional view taken along the line 9—9 of FIG. 7.

Member 10 comprises an attaching flange plate 14, a pair of baffle plates 16 and 18, and a removable end plate 20, which are disposed in parallel, spaced relationship to one another, and are supported by a plurality of pulse tubes, guide rods, and yoke rods. As shown in FIG. 9, circular attaching flange 14 includes a pair of first apertures 22 disposed on a first diameter of the flange, and second and third apertures 24 and 26 respectively, disposed on a second diameter of the flange.

A pair of first pulse tubes 28 are mounted in apertures 22 and extend to first baffle plate 16 when they are attached by welding or otherwise. As is shown in FIGS. 1 and 2, first pulse tubes 28 have portions of their tubular walls cut away, so that each tube terminates in a tail, or shield portion 30 which defines their respective points of attachment with baffle 16.

A second pulse tube 32 extends from aperture 24, through a coaxially aligned aperture in baffle 16 into the compartment defined between baffles 16 and 18. As with first tubes 28, a portion of the tubular wall of second tube 32 is cut away to define a tail shield portion 34 which defines the place of attachment of tube 32 with baffle 18.

Third pulse tube 36 extends from aperture 26 in flange 14, through a coaxially aligned aperture in baffle 16, to its termination at aperture 38 in baffle 18. Pulse tube 36 includes a skewed cone portion 40, which serves to define a bellmouth opening to the compartment which lies upstream of baffle 18.

A pair of guide rods 42 also extend between baffles 16 and 18. In the embodiment shown, guide rods 42 include portions extending upstream of baffle 18 to form two of the four yoke rods 44, which support mounting nut 46. Mounting nut 46 releasably supports end plate 20 by means of bolt 48 which extends through plate 20 and threadedly engages a portion of nut 46.

Describing the construction of filter elements 12 in more detail, reference should now be made to FIGS. 3-6. Each element 12 is of a hollow, cylindrical configuration of predetermined length. Preferably, each element 12 is of identical construction and dimension. Each element 12 comprises a perforated, cylindrical inner liner 50, constructed of perforated sheet metal or the like, about which is disposed a pleated filter media 52. A perforated outer liner band 54 may cover the ends of filter media 52, and a spiral bead 56 constructed of heat resistant silicone rubber encircles filter media 52. Each end of filter elements 12 is housed by an annular end cap 58 including a plastisol gasket or seal 60.

Baffles 16 and 18 have substantially the same diameter as that of the filter element inner liner 50, yet are sufficiently small to allow the overlying relationship shown in FIG. 6. The baffles 16 and 18 are spaced apart by a distance equal to the predetermined length of filter elements 12. The distance between baffle 18 and end plate 20 is generally equal to said predetermined distance, being longitudinally adjustable by virtue of the threaded connection between bolt 48 and nut 46. The distance between baffle 16 and attaching flange 14 is slightly greater than said distance in order to accommodate the thickness of a tube sheet 62 which is positioned between flange 14 and baffle 16, and to which flange 14 is bolted or welded. Tube sheet 62 is actually the dividing wall between the clean air plenum and the dirty air chamber of the filter house, and in other embodiments of the present invention, the pulse tubes may actually be welded directly to the tube sheet, thus eliminating the attaching flange 14.

It will also be noted that the tubular walls of pulse tubes 28, 30 and 32 intersect the circumferential edges 64 and 66 of baffles 16 and 18 respectively at points of tangency, as do guide rods 40, and yoke rods 44. Thus, as filters 12 are slid on or off support member 10 when end plate 20 is removed, they are guided by four points of contact between each filter inner liner and the rods and tubes of member 10. Upstream of second baffle 18, portions of each of the four yoke rods 44 serve to guide filter 12; between the second and first baffle plates the two pulse tubes 32 and 36 and the two guide rods 42 serve as guide means, and between first baffle 16 and attaching figure 14, tubes 28, 32 and 36 provide guide means.

When fully assembled, as shown in FIG. 3, the end cap 58a of filter element 12' seals against tube sheet 62, while its opposite end cap 58b seals around a portion of baffle plate 16; and cap 58c of filter element 12" is positioned around the circumferential edge 64 of baffle plate 16 and seals with end cap 58b, while its opposite end cap 58d is positioned around a portion of circumferential edge 66 of baffle plate 18; end cap 58e of filter element 12''' is also situated around a portion of circumferential edge 66 of baffle plate 18 and seals with end cap 58d, while its opposite end cap 58f seals with ring portion 68 of end plate 20.

A detailed view of the manner in which filters 12'-12" seal with each other, and sit with respect to the baffle plates is shown in FIG. 6. There it is seen that, when filters 12 are mounted on member 10, the gasket material on each annular end cap seals with a corresponding gasket of another end cap; in the case shown gasket 60b seals against gasket 60c. In addition, the point of abutment of the filter ends is generally at the plane defined by the underlying baffle plate, thus it will be appreciated that each filter 12 is substantially isolated from each other filter 12 by the sealing cooperation of their annular end caps 58 and the spaced baffle plates 14 and 16, which serve to define discrete filtered air chambers therebetween.

In the preferred embodiment, end plate 20 includes ring portion 68, adapted to engage annular end cap 58f as shown in FIG. 3, and a dish portion 70, which is adapted to fit into and seal off the open end of filter 12'''. This dish provides four functions. First, it provides a short, cylindrical length which aligns and supports the outboard end of filter 12''', which would otherwise be unsupported. Second, the dish effect strengthens end plate 20 so that less of the cleaning pulse energy is dissipated in the cover metal. Third, fastening bolt 48, with its special handle 72, may be placed entirely inside the cavity formed by the dish of end plate 20, thus keeping the overall length of the assembly at a minimum. Finally, when dish 70 bottoms out on the face of mounting bolt 46, the user is signaled that bolt 48 is properly tightened.

As previously pointed out, fastening bolt 48 includes a threaded portion 74 and a special, offset handle loop 72. Offset handle 72 allows the bolt to be hand tightened, and discourages the use of mechanical wrenching means, which in turn prevents the elements from being overtightened, and possibly damaged. The offset handle 72 also unbalances the bolt to discourage its loosening from vibrations or pulsing.

As a further safety precaution, mounting nut 46 includes an unthreaded pilot hole portion 76 into which threaded portion 74 of bolt 48 is guided before engaging the threaded portion 78 of nut 48. This arrangement ensures against cross threading of bolt 48 and nut 46.

Figure 8:
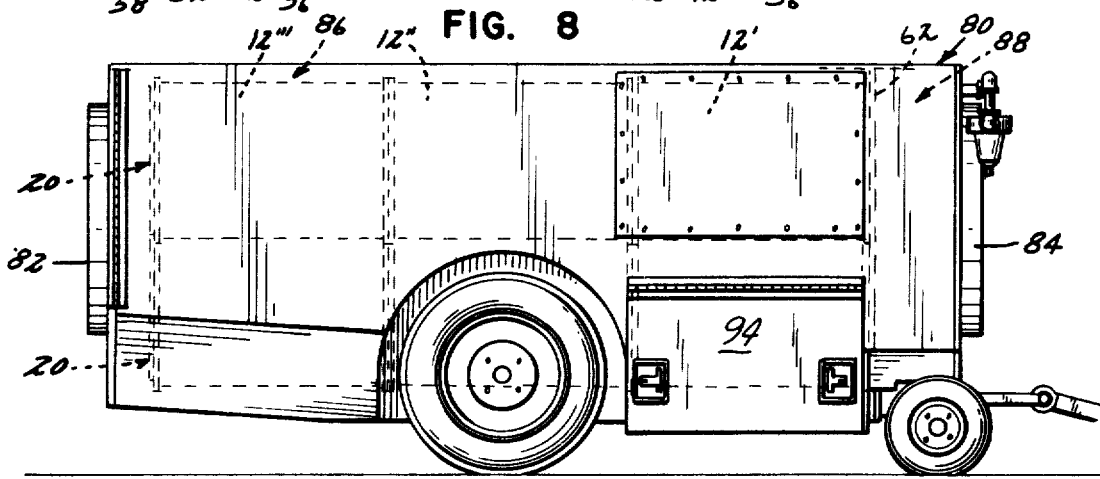
FIG. 8 is a side elevation of the portable filter house shown in FIG. 7.

It is contemplated that the support member 10 will be employed in a filter house similar to the portable filter wagon 80 shown in FIGS. 7 and 8. Wagon 80 is designed for applications such as in underground mining chambers, and includes an inlet 82 and an outlet 84. The interior of wagon 80 is divided into two chambers by tube sheet 62. Upstream of tube sheet 62 is the dirty air chamber 86; downstream of tube sheet 62 is clean air plenum 88.

Five support members 10, holding fifteen filter elements 12 are mounted in wagon 80 by bolting the attaching flanges 14 of the respective support members to tube sheet 62, as indicated in FIG. 9. A service door 90 provides access to the outboard ends of each support member.

Directed at the opening of each pulse tube into the clean air plenum is a nozzle 92 plumbed to a source of compressed air for generating a pulse of air down each tube.

In operation, outlet 84 is connected to means (not shown) for inducing a flow of air through filter wagon 80 by establishing a relative vacuum in clean air plenum 88, which, in turn, is in fluid communication with the interior, clean air chamber of each filter element 12 by virtue of the pulse tubes. Thus, dust laden air is drawn into dirty air chamber 86 via inlet 82, through the pleated filters 52 and inner liners 50 of the various filter elements 12. After passing through the filters, the air is clean and passes up the pulse tubes and out of the wagon 80 via outlet 84.

Since each filter element 12 is serviced by its own pulse tube, or set of pulse tubes, it is possible to clean each filter element without disturbing the filtering function of any other filter. This cleaning is accomplished by directing a rapid pulse of compressed air at the appropriate pulse tube or tubes. In the assembly shown in FIG. 3, for example, filter element 12' would be cleaned by simultaneously directing blasts of compressed air down the pair of first pulse tubes 28. The high velocity jets of air move into the pulse tubes, pushing air in the tubes ahead of them, and pulling additional air into the tubes from the clean air plenum. The total effect is to create a pressure pulse inside the element. In a prototype of the wagon shown, this pressure pulse is about 50 inches of water column in magnitude, lasting about 100 to 200 milliseconds. This pressure pulse flows outward through the filter media, carrying deposited dust with it.

Filter elements 12" and 12''' would be similarly cleaned by pulsing air down tube 32 and 34, respectively. Dust so loosened from the filters falls to the floor of wagon 80, from which it may be extracted by way of door 94.

As has been previously pointed out, first tubes 28 and second tubes 32 are not terminated in squared off ends inside the element chambers, but, rather, terminate in tail portions 30 and 34, respectively. This method of terminating the pulse tubes has three distinct advantages. First, each tube tail, by being fused with a downstream baffle plate, enables the entire pulse tube to act as a structural member of support member 10, thus allowing the entire filter and support assembly to be mounted in cantilever fashion in wagon 90. It is to be noted, at this point, however, that support member 10 could be oriented vertically as well as horizontally. Secondly, the tail shields 30 and 34 prevent the filter media pleats from being excessively worked by the cleaning air blasts, and failing prematurely. Thirdly, the tube tail extensions reduce pressure drop of the regular filtered air flow by reducing the vena contracta at the tube inlets. The cone portion 40 of third tube 36 acts as both a bellmouth and an effective diffuser for the cleaning pulse. It is contemplated in the preferred embodiment that second tube 32 and third tube 36 be of equal diameter, said diameter being approximately one-half the diameter of the filter elements. Similarly, the diameter of the first pulse tubes 28 is equal, although less than the diameter of the second and third pulse tubes. There are two first pulse tubes because the compartment inside element 12' is effectively divided into two halves by pulse tubes 32 and 36. This construction provides for the lowest air pressure drop in first tubes 28.

By virtue of "packing" the pulse tubes for each filter element inside the filters, it is possible to dramatically decrease the working volume of the filter house, while maintaining a high level of air flow capability. In the prototype of the preferred embodiment, the important dimensions are as follows. Each filter element 12 has a length of approximately 25 inches, and an inside diameter of 12 inches, and an outside diameter of 16.5 inches. The pleated media comprises approximately 650 pleats two inches in width. The overall length of support member 10 from attaching flange 14 to mounting nut 46 is seventy-two and one half inches. The depth of dish 70 and end plate 20 is approximately three inches, making the overall length of the assembled support member approximately seventy-five inches. The outside diameter of tubes 32 and 36 is six inches; the outside diameter of tubes 28 is four inches. Baffle plates 16 and 18 have diameters of twelve inches. The overall length of wagon 80 is eighty-five inches. The outside diameter of tubes 32 and 36 is six inches; the outside diameter of tubes 28 is four inches. Baffle plates 16 and 18 have diameters of twelve inches. The overall length of wagon 80 is eighty-eight inches, width fifty-six inches, height forty-three inches. Inlet 82 and outlet 84 have twenty-four inch diameters. The length of the dirty air chamber is seventy-eight inches, clean air chamber nine and one half inches.

The prototype thus described is capable of cleaning twelve thousand cubic feet of air per minute. The most efficient pulse jet air filters previously known, which were capable of comparable air flows, have had overall working volume dimensions nearly twice those of the wagon using the present inventive support member.

It will be appreciated from the foregoing that I have invented a multiple filter element support member which can be used to dramatically reduce the working volume of filter houses, while maintaining high air flow capabilities.

What is claimed is:

1. Support means for supporting a hollow filter element in a filter house, said support means comprising means for dividing a space interiorly of said filter element into a plurality of spaces, and conduit means including a discrete conduit extending to each of said plurality of spaces, each of said discrete conduits being in fluid communication with one of said plurality of spaces for providing fluid communication between said plurality of spaces and a source of compressed air.

2. The support means of claim 1 wherein said dividing means comprise a plurality of spaced plates, each of said plurality of spaces being defined between a pair of adjacent plates, and at least one of said discrete conduits extending through at least one of the plates.

3. The support means of claim 2 wherein a portion of the tubular wall of each discrete conduit provides means for supporting a filter element in a predetermined position.

4. Support means for supporting a plurality of hollow cylindrical filter elements in coaxially aligned, end-to-end relationship, comprising isolating means including a plurality of baffles for isolating from one another a plurality of coaxially aligned spaces interiorly of the supported filter elements, and conduit means located generally within said coaxially aligned plurality of spaces for providing discrete fluid communication between each interior space and a source of compressed air, said conduit means being comprised of a plurality of pulse tubes, each of which extends into at least one of said interior spaces.

5. The support member of claim 4 wherein:
  (a) the baffles of isolating means include:
  (i) an attaching flange plate,
  (ii) first and second circular baffle plates, and
  (iii) a removable end plate
  in parallel, spaced relationship, and wherein
  (b) the pulse tubes of said conduit means include:
  (i) a first pulse tube, extending from the attaching flange to the first baffle plate, in fluid communication with the space defined between the attaching flange and the first baffle plate,
  (ii) a second pulse tube in fluid communication with the space defined between the first and second baffle plates, and extending through said first baffle plate to the attaching flange, and
  (iii) a third pulse tube in fluid communication with the space defined between the second baffle plate and the end plate, and extending through the second baffle plate and first baffle plate to the attaching flange.

6. The support member of claim 5 which further includes an additional first pulse tube extending from the attaching flange and in fluid communication with the space defined between the attaching flange and the first baffle plate.

7. The support member of claim 6 wherein said first pulse tubes each include a tail portion extending to and being attached with the first baffle plate and wherein said second pulse tube includes a tail portion extending to and being attached with the second baffle plate.

8. The support member of claim 7 wherein the third pulse tube includes a cone portion opening into the space defined between the second baffle plate and the end plate.

9. The support member of claim 8 wherein said pulse tubes extend parallel to one another, and said first baffle plate includes a circumferential edge that intersects the tubular wall of each said pulse tube at a respective point of general tangency.

10. A multiple filter unit comprising:
  (a) first, second and third filters, each filter being of a predetermined length and a hollow, cylindrical configuration with open ends, each filter further including:
    (i) a hollow, cylindrical, pleated media, filter element,
    (ii) a perforated, cylindrical, inner liner within the filter element defining a clean air chamber, and
    (iii) an annular end cap at each end of the filter, wherein the diameter of the inner liner in the first filter is equal to the diameters of the inner liners in the second and third filters;
  (b) means for supporting said filters in coaxial, end cap-to-end cap abutting relationship, for isolating the clean air chamber of each filter from each other clean air chamber, and for providing fluid communication between the clean air chamber of each filter and a clean air plenum and means for generating a reverse pulse of air in each said chamber, comprising:
    (i) an attaching flange plate having a pair of first apertures therein, a second aperture therein, and a third aperture therein,
    (ii) a first circular baffle plate in parallel, spaced relationship to said attaching flange, the distance therebetween being generally equal to the predetermined length of said first filter, said first baffle plate having a diameter substantially equal to the diameter of the inner liner of said filter, and including a second aperture therein coaxially aligned with the second aperture in the attaching flange, and a third aperture therein coaxially aligned with the third aperture in the attaching flange, said baffle plate having a circumferential edge, about which a portion of an annular end cap of the first filter seals and a portion of an annular end cap of the second filter seals, said second and third apertures in the first baffle plate each intersecting the circumferential edge at a corresponding point of tangency, (iii) a second circular baffle plate in parallel, spaced relationship to said first baffle plate, the distance therebetween being equal to the predetermined length of the second filter, said second baffle plate having a diameter equal to that of the first baffle plate, and including a third aperture therein generally aligned with the third aperture in the attaching flange and the first baffle plate, said second baffle plate having a circumferential edge about which a portion of an annular end cap of the second filter seals and a portion of an annular end cap of the third filter seals, said third aperture in the second baffle plate intersecting the circumferential edge thereof at a point of tangency, (iv) a removeable, circular end plate in generally parallel, spaced relationship to said second baffle plate, said end plate including a ring portion upon which abuts an end cap of the third filter, and a dish portion extending into the clean air chamber of the third filter, said dish portion having an outside diameter generally equal to the diameter of the inner liner of the third filter, (v) means for varying the distance between said end cap and said second baffle plate, including a bolt extending through said dish portion, and a mounting nut for engaging said bolt spaced a predetermined distance from the second baffle plate, (vi) a pair of first pulse tubes having open ends mounted in the first apertures of the attaching flange, said tubes extending into the first clean air chamber and being in fluid communication therewith, each said tube including a tubular wall, at least a portion of which is in tangential contact with the inner liner of the first filter and extends to, and is attached with, the first baffle plate, (vii) a second pulse tube in fluid communication with the clean air chamber of the second filter, mounted in said coaxially aligned second apertures, with a first portion of its tubular wall in tangential contact with the inner liner of the second filter and extending to, and attached with, the second baffle plate, (ix) a third pulse tube in fluid communication with the clean air chamber of the third filter, mounted in said coaxially aligned third apertures, with a first portion of its tubular wall in tangential contact with the inner liner of the first filter, and a second portion of its tubular wall in tangential contact with the inner liner of the second filter, (x) a pair of guide rods extending between the first and second baffle plates, disposed in parallel with said pulse tubes.

11. The structure of claim 10 wherein the first pulse tubes are of equal diameter, and wherein the portion of the second and third pulse tubes extending between the attaching flange and first baffle are of equal diameter.

12. The structure of claim 11 wherein said diameter of the second and third tubes is greater than the diameter of the first tubes.

13. The structure of claim 12 wherein the attaching flange is circular, wherein the first apertures are disposed on a first diameter thereof, one on each side of the center of said flange and wherein the second and third apertures are similarly disposed along a second diameter oriented perpendicularly to the first diameter.

14. The structure of claim 13 wherein the third aperture in the second baffle plate is of larger diameter than the third apertures in the attaching flange and first baffle plate, and wherein the tubular wall of the portion of third pulse tube extending between the first and second baffle plates is flared to define a bellmouth.

15. The structure of claim 14 wherein the bolt engaging said mounting nut includes an offset handle portion which fits entirely within the recess defined by said dish portion, when said bolt is fully tightened.

16. The structure of claim 15 wherein the mounting nut includes means for preventing cross threading of the bolt and the nut.

* * * * *